3,555,625
DOUBLE SUPPORT LINE TIE
Jerome C. Hoban, Parma Heights, Ohio, assignor to Preformed Line Products Company, Cleveland, Ohio, a corporation of Ohio
Filed Mar. 25, 1968, Ser. No. 715,699
Int. Cl. F16g 11/00
U.S. Cl. 24—131      1 Claim

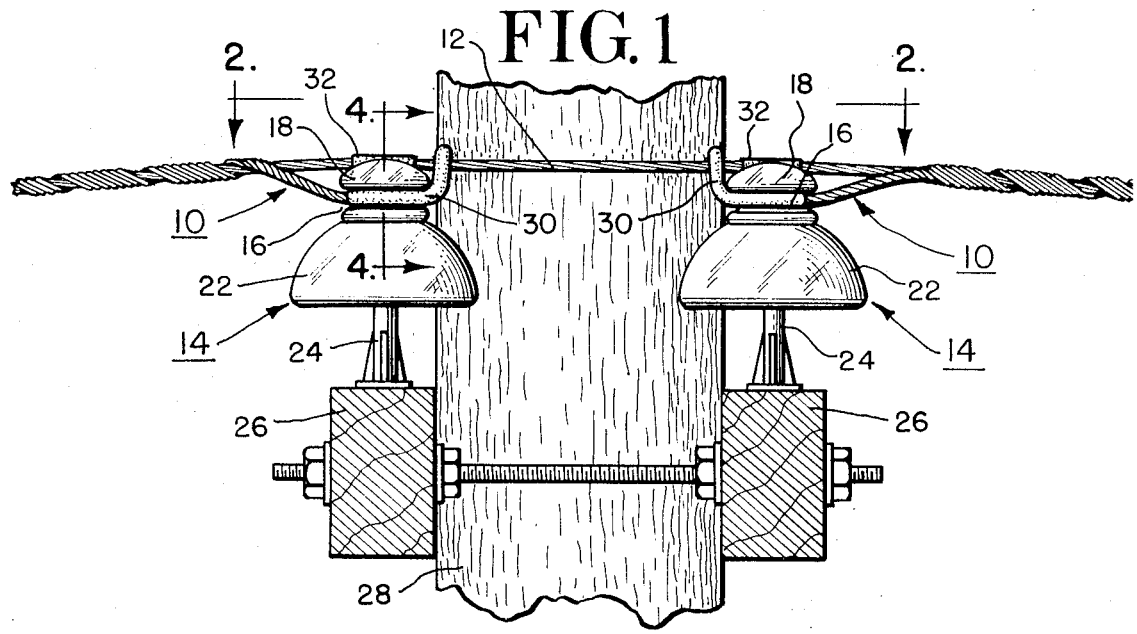
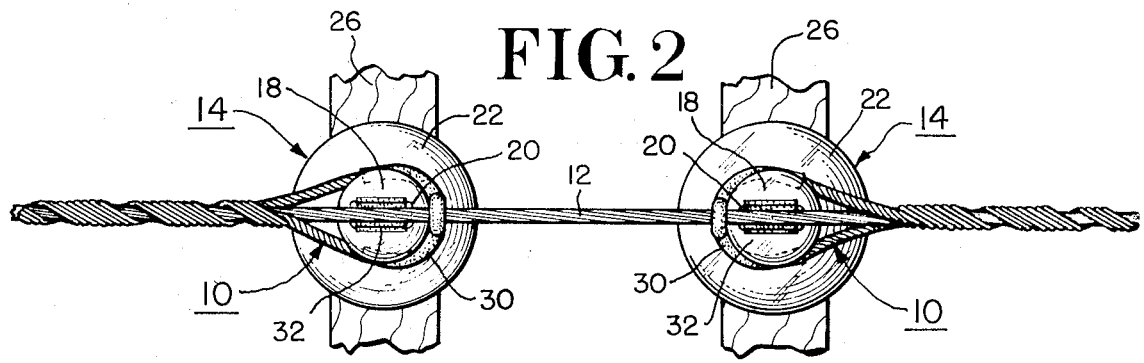
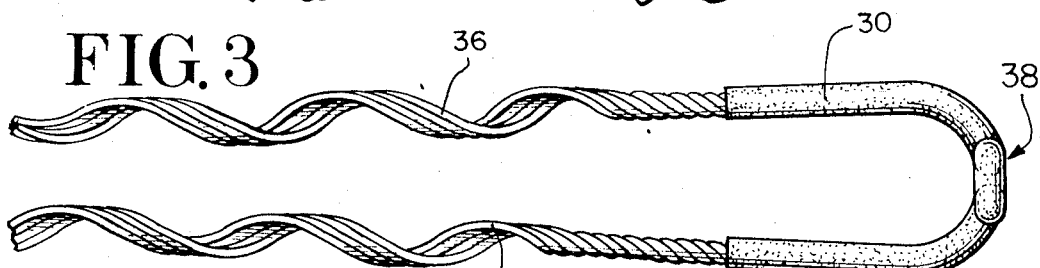
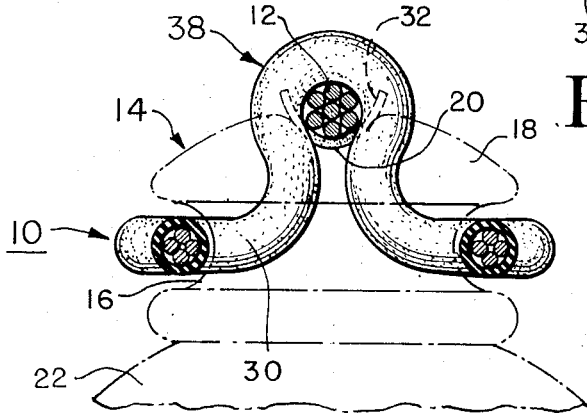
Inventor
Jerome C. Hoban
By Hume, Clement, Hume & Lee
Attorneys United States Patent Office 3,555,625
Patented Jan. 19, 1971

ABSTRACT OF THE DISCLOSURE

An appliance and method for fastening an electrical conductor, etc., to a mounting device is disclosed. The appliance is U-shaped with the bight portion preferably bent perpendicular to the legs and with the terminal segments of each leg being helically preformed to cooperatively encircle and grip the conductor. The conductor is positioned in a guide recess of a transverse cap of the mounting device and the appliance assembled thereto by inserting the bight portion over the conductor adjacent one side of the mounting device with the legs extending along opposed sides of a reduced diameter neck of the mounting device that underlies the cap. The installation is completed by wrapping the helically preformed leg segments about the conductor thereby captivating the legs beneath the mounting device cap to firmly retain the conductor in the guide recess. Other features are disclosed.

BACKGROUND OF THE INVENTION

The present invention relates generally to appliances to be used in connection with linear bodies such as electrical conductors, cables, stranded ropes and the like and, more specifically, pertains to a new and improved appliance for securing such linear bodies to various types of suspension or mounting devices.

Electrical conductors and other types of suspended linear bodies must, of course, receive support at periodic intervals along the course of their lengths. A variety of support devices and associated apparatus for fastening the linear bodies thereto are known to the prior art.

One method widely used in the past is the lashing of the conductor to the support member by means of a wire or the like. This method has several distinct disadvantages. For example, it is generally desired that the lashing member securely grip the conductor so as to prevent significant axial displacement thereof, however, it is well known that such a condition is extremely difficult to attain wth a wire lashing unless auxiliary clamping devices are employed. Additionally, since the lashing member need be relatively pliable in order for it to be easily wrapped about the conductor and the suspension device, it has little or no natural resiliency. Thus, vibration of the conductor distorts the lashing wire and tends to loosen at the ends until it no longer grips the conductor in the required fashion.

Another prior art method utilizes clamps for securing the conductor to the suspension member. Typically the gripping portions or jaws of these clamps are relatively rigid and prevent flexing of that portion of the conductor held therewithin. Thus, there is an abrupt transition between the free portion of the conductor which is continually being flexed or vibrated by the wind or other climatic conditions and that conductor portion which is fixedly held by the jaws of the clamp. This abrupt interface results in an exceptional stress concentration often leading to premature fatigue failure of the conductor.

In summary, it has been found desirable to provide a support appliance that displays the gripping qualities of the clamp while avoiding the undesired stress concentrations inherent therein. It is also preferred that the appliance be exceptionally easy to install and remove since, in most instances, the assembly and disassembly takes place at an elevated position under awkward and confined working conditions, as atop a suspension tower or cross-arm of a line pole.

Line ties suitable for use with various types of support members and satisfying the aforementioned requirements are disclosed and claimed in U.S. Pats. 3,042,745, Williams; and 3,286,023, Eucker, both assigned to the same assignee of the present invention. The various line ties disclosed in these patents are, however, adapted to extend along the conductor for a considerable distance on either side of the principal support point. In most instances, such an arrangement is entirely satisfactory but where there are two or more closely adjacent support points, such as on a double cross-arm structure of a line pole, the adjacent ties may mutually interfere and prevent the proper installation or operation of one or both of the appliances.

SUMMARY OF THE INVENTION

It is therefore a primary object of the present invention to provide a new and improved line tie, that although of more general utility, is suitably adapted for fastening a linear body to a pair of closely adjacent support points.

It is another object of the present invention to provide a line tie of the above capability that also displays all of the earlier summarized preferred features for a line tie construction.

It is a further object of the present invention to provide an appliance that suitably secures a linear body to a support point while substantially preventing abrasion or fatigue damage to the linear body, the appliance or the mounting device.

It is still a further object of the invention to provide a method for installing the aforesaid line tie appliance that assures the required conductor support and positioning and which method further is effected without the necessity of special tools or exceptional manual skills on behalf of the lineman.

The invention is therefore directed to an appliance for fastening a linear body to a mounting device. The appliance comprises a dead end member including a pair of opposed leg portions each helically preformed for at least a predetermined terminal segment of their lengths. The dead end member further includes an intermediate return bent portion, preferably formed approximately perpendicular to the plane defined by the pair of appliance leg portions.

According to the method of the invention, the appliance is installed by inserting the return bent portion over the conductor at a position adjacent one side of the mounting device with the appliance leg portions extending along opposed sides of a reduced diameter neck of the mounting device to an opposite side thereof. The neck underlies an enlarged transverse cap portion of the mounting device that includes a saddle-shaped top surface contour for seating the conductor. The helically preformed leg segments of the appliance are wrapped about the conductor in gripping relation thereto for captivating the legs beneath the mounting device cap portion in close proximity to the neck to thereby firmly retain the conductor in the seating recess.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 as a side elevational view of an electrical conductor as mounted to a pair of closely adjacent support points by appliances constructed according to the present invention;

FIG. 2 is a plan view of the supported conductor assembly of FIG. 1;

FIG. 3 is an enlarged plan view of one of the identical appliances of FIGS. 1 and 2, as shown in an unassembled condition;

FIG. 4 is a cross-sectional view taken along lines 4—4 of FIG. 1 but with the mounting device represented in phantom oltuine to permit a clearer illustration of the positioning and contour of the bight or return bent portion of the appliance.

DESCRIPTION OF THE PREFERRED EMBODIMENT

Referring now to FIG. 1, there are shown a pair of identical appliances 10 according to the present invention, each being illustrated in an assembled condition for securing a linear body 12 to respective ones of a pair of closely adjacent mounting devices 14.

In this instance, the linear body 12 is an electrical power transmission line and the mounting devices 14 are glass or ceramic pin-type electrical insulators, although it is understood that the appliances 10 are of more general utility as lashing or securing devices.

The insulators 14 each include a reduced diameter neck portion 16 and a transverse cap portion 18 of significantly larger diameter than the neck, the cap portion having a saddle-shaped top surface contour portion 20 (FIGS. 2 and 4) adapted to index and seat the electrical conductor 12. The electrical insulators 14 further include flared skirt portions 22 joining the respective neck portions to transverse bases into which there are fixedly mounted individual supporting pins or posts 24. The insulator skirt portions 22 prevent moisture from accumulating between the support arm or post and the insulator thereby minimizing the danger of a short circuit. The posts 24 mount the insulators on respective ones of a pair of closely adjacent and parallel cross-arms 26 of a line pole 28, only a section of which is visible in the drawing.

From FIGS. 1 and 2, it may be appreciated that the appliances 10 are identical and, for this reason, only the one on the left-hand side of the drawing will be described in detail, although it is understood that the description is equally applicable to the remaining appliance and the latter appliance bears like numbering to clearly indicate the correspondence. Specifically, appliance 10 to the left side of the drawing comprises a dead end member having a bight or return bent portion that is installed over the conductor 12 in an inverted U-shaped orientation immediately adjacent the right-hand side of the mounting device 14. The return bent portion is joined to a pair of opposed leg portions that are positioned to extend along opposed sides of the reduced diameter neck 16 to the opposite or left-hand side of the mounting device 14. The appliance bight portion as well as the contiguous leg segments are composed of a plurality of wire strands tightly wound to form a closed helix while the more remote or terminal segments of the legs are preformed to open helices of a pitch, internal diameter and relative phase relation so as to intertwine in contiguous, nonoverlapping relation about the cable 12 in a predetermined gripping relation thereto, as illustrated in FIGS. 1 and 2.

The distance along each leg at which the closed helix terminates and the open helix commences is determined by the desired relative phasing of the helically preformed legs, the geometry of the installation, i.e., the size and configuration of the mounting device and cable, and the desired tension on the appliance in its assembled position, as will be understood by those skilled in the art.

The appliances 10 as installed on the closely adjacent support points of FIGS. 1 and 2 are oriented such that their leg portions extend in opposite directions so as to preclude mutual interference between the appliances. Each appliance is also provided with an integral protective jacket or coating 30 along those portions of the member that are adapted to engage the mounting device 14 and/or electrical conductor 12. The protective jacket is of neoprene or other material suitably adapted to prevent abrasion damage to the appliances 10 and the conductor 12. For like reasons, it is presently preferred to interpose a neoprene pad 32 or the like between the transmission cable 12 and the saddle-shaped surface recess 20 of the cap portion 18.

The structure of the appliance 10 may be appreciated in further detail by reference to FIGS. 3 and 4. As seen in FIG. 3, the appliance 10 comprises a pair of elongated leg portions 34 and 36, respectively, each of which has been helically preformed along a predetermined terminal segment of its length, the extent of the open helical leg segments and their spacing from the return bent portion 38 of the appliance being established by the geometry of the insulator device and the gripping tension requirements of the installation, as noted earlier herein. Briefly, however, the open helix of each leg should commence at a point sufficiently close to the bight 38 such that once the appliance is installed any expected flexing or vibration of the conductor 12 will not displace it from the saddle-shaped groove 20 and/or the leg portions 34 and 36 will not escape from beneath the enlarged cap 18 of the insulator to thereby release the tie. On the other hand, it is preferable not to commence the open helix of each leg so close to the bight that it is exceptionally difficult for the lineman to install the device or an extreme tension is created on the cable or mounting device.

As an alternative to the illustrated construction and although not preferred, it is feasible for the entire leg portions of the appliance to be in the form of an open helix with the installer commencing the wrap about the conductor 12 at a point determined according to his experience and discretion.

The appliance 10 in the present instance is constructed of a plurality of reinforced elements or strands which, as previously stated, have been helically preformed or preshaped along a predetermined terminal segment of each leg portion 34, 36. It is to be understood, however, that the appliance 10 may be composed of one or more elements and that the criteria for defining the number of elements is independent of the present invention.

At any rate, the helically preformed terminal segments of leg portions 34 and 36 are similar in the present case to those utilized in the construction of other appliances such as those disclosed in United States Letters Patents to Thomas F. Peterson, e.g., 2,609,653 and 2,761,273, and may be manufactured by any suitable method such as that disclosed in U.S. Pat. 2,691,865, all of which patents are assigned to the same assignee as the present invention. The interwound strands or elements may be made of any suitable material that has sufficient strength, resiliency, and flexibility to meet the requirements of the lashing. Generally, the lashing or reinforcement members will be made of aluminum, steel or similar metals, although molded plastics or the like may be used in special circumstances. The individual elements of the band may be secured, if desired, in their bridging relationship by means of an adhesive, solder, brazing compound or the like.

The helically preformed terminal segments of the leg portions 34 and 36 are preformed to have a pitch length sufficiently long that they may be applied sideways to an electrical conductor and then wrapped thereabout by rotating the legs around the conductor in the direction of propagation of the helices. The internal diameter of the helically preformed segments of each leg portion will in most instances be somewhat less than the external diameter of the conductor so that they are forced to resiliently expand to accommodate the latter although the internal diameter of the helix should be sufficiently great so that the elastic limit of the material is not exceeded. In this manner, it is possible to achieve a tightly gripping relationship between the helices and the conductor and essentially preclude relative longitudinal movement therebetween. Of course, if it is desired that a relative axial movement be permitted between the conductor and the helical strands, such may be accomplished by making the internal diameter of the helically preformed terminal leg segments equal to or somewhat larger than the overall diameter of the conductor 12 according to the degree of conductor mobility desired.

In the illustrated and preferred embodiment, the appliance 10 is constructed of four mutually conforming reinforcement elements positioned in bridging relationship throughout the open helical segments of the leg portions 34 and 36 so as to form a helical band. The pitch of the helical bands of each leg are identical but are offset in phase relative to one another so as to allow them to be interwound in mutually contiguous nonoverlapping relation, as illustrated in the drawings.

The bight 38 and the contiguous segments of the legs 34 and 36 of the appliance 10 are preferably wound into a closed helix and the closed helix protectively coated over the major part of its length by a resilient material to preclude abrasion damage to any of the abutting components due to relative movement between the appliance, the mounting device and the conductor. The preferred thickness of the coating is apparent from the view of FIG. 4.

The closely wound helical portion of the appliance 10 is of a generally U-shaped outline but with the bight portion 38 bent upward to lie in a plane approximately perpendicular to that defined by the contiguous segments of the appliance leg portions 34 and 36. As best shown in FIG. 4, the bight 38 is also contoured to define a narrow diameter, eyelet-like opening between its opposed segments for receiving the conductor 12. Preferably, the internal diameter of the eyelet-like opening is slightly smaller than the outer diameter of the cable 12 so that the cable is firmly gripped by the bight portion to prevent significant vertical movement relative to the opposed sides of the bight 38. Such a configuration is preferred as it has been found to securely and positively locate the conductor 12 along the base contour of the saddle-shaped recess 20 of the cap 18.

The appliance 10 is installed with relative ease and without special skills or tools. Specifically, the open end of the bight 38 of the appliance is forced downwardly over the conductor, the internal sides of the bight being resiliently expanded to admit the conductor to the eyelet-like opening. The leg portions of the appliance are positioned to extend along the opposed sides of the neck portion 18, in a direction generally parallel to the conductor 12, to the opposite side of the mounting device 14.

Once properly positioned, the legs 34 and 36 are crossed over the conductor 12 so that the legs 34 and 36 are positioned respectively above and below the conductor. The legs are then rotated about the conductor 12 in a clockwise direction to effect a wrapping of the helically preformed leg segments thereabout to complete assembly of the appliance and provide an installation as shown in FIGS. 1 and 2. The device is removed by performing the foregoing operations in reverse.

The asymmetrical configuration of the appliance 10 relative to the center axis of the support device 14 makes it especially attractive for use in conjunction with closely adjacent support points of the type illustrated and described herein, although it is to be understood that the appliance is not restricted to such applications. The appliance, in addition to being easy to install and remove, also offers other attractive features. For example, vibration or other motion of the conductor due to climatic conditions or the like is resiliently damped by the helical reinforcement members with a minimum of stress concentration along the cable 12. Further, the protective neoprene coating 30 and pad 32 substantially prevent abrasion damage both to the appliance and to the conductor thereby assuring a long useful life for both items.

While a particular embodiment of the present invention has been shown and described, it is apparent that various changes and modifications may be made, and it is therefore intended in the following claim to cover all such modifications and changes as may fall within the true spirit and scope of this invention.

I claim:
1. An appliance for fastening a linear body to a mounting device having a transverse cap portion with a saddle-shaped top surface contour adapted for seating said linear body, and a reduced diameter neck portion underlying said cap portion, said appliance comprising:

a dead-end member including a pair of opposed leg portions each helically preformed to define an open helix for at least a predetermined terminal segment of their respective lengths and an intermediate return bent portion of a generally U-shaped configuration and having a central part thereof bent vertically to lie in a plane approximately perpendicular to said leg portions and formed in an eyelet-like configuration with the center opening of said eyelet being approximately equal to the diameter of said linear body and the opposed segments of said eyelet adjacent the plane of said leg portions being normally spaced by a distance less than the diameter of said linear body but being resiliently displaceable outwardly to a spacing at least equal to said diameter, said eyelet part of said return bent portion being adapted for insertion over said linear body to one side of said mounting device for positive location of said linear body within said center eyelet opening and with said leg portions extending in a like direction along opposed sides of said mounting device neck portion to an opposite side of said mounting device and said helically preformed leg segments being intertwined in gripping relation about said linear body on said opposite side of said mounting device for securing said leg portions beneath said mounting device cap portion in close proximity to said reduced diameter neck portion to firmly retain said linear body in said saddle-shaped top surface contour of said mounting device.

References Cited

UNITED STATES PATENTS

| | | | |
|---|---|---|---|
| 2,943,135 | 6/1960 | Bertling | 57—145 |
| 3,018,319 | 2/1962 | Quayle | 174—79 |
| 3,042,745 | 7/1962 | Williams | 174—173 |
| 3,080,448 | 3/1963 | Nordstrom | 174—173UX |
| 3,142,472 | 7/1964 | Lipschutz | 24—131X |

FOREIGN PATENTS

| | | | |
|---|---|---|---|
| 1,077,740 | 3/1960 | Germany | 174—173 |

BERNARD A. GELAK, Primary Examiner

U.S. Cl. X.R.

174—173; 248—63